US006217983B1

(12) United States Patent
Alam et al.

(10) Patent No.: US 6,217,983 B1
(45) Date of Patent: Apr. 17, 2001

(54) R-FOAM AND METHOD OF MANUFACTURING SAME

(75) Inventors: Shahriar Alam, Chandler; Thomas A. Hunter, Scottsdale; Michael J. Valle, Mesa, all of AZ (US)

(73) Assignee: McDonnell Douglas Helicopter Company, Mesa, AZ (US)

( * ) Notice: Subject to any disclaimer, the term of this patent is extended or adjusted under 35 U.S.C. 154(b) by 0 days.

(21) Appl. No.: 09/047,960

(22) Filed: Mar. 25, 1998

(51) Int. Cl.[7] ........................................ B32B 3/12

(52) U.S. Cl. ........................ 428/158; 428/3.65; 428/200

(58) Field of Search ................................ 428/195, 200, 428/201, 36.5, 158; 156/235, 210, 277, 324, 267, 269, 289

(56) References Cited

U.S. PATENT DOCUMENTS

| | | | |
|---|---|---|---|
| 3,672,986 | * | 6/1972 | Schneble, Jr. et al. . |
| 4,049,844 | * | 9/1977 | Bolon et al. . |
| 4,270,985 | * | 6/1981 | Lipson et al. . |
| 4,447,471 | * | 5/1984 | Putt et al. . |
| 4,529,477 | | 7/1985 | Lundberg et al. . |
| 4,775,439 | | 10/1988 | Seeger, Jr. et al. . |
| 4,919,994 | | 4/1990 | Incremona et al. . |
| 4,933,208 | | 6/1990 | Dorinski . |
| 5,045,141 | * | 9/1991 | Salensky et al. . |
| 5,151,222 | | 9/1992 | Ruffoni . |
| 5,352,315 | * | 10/1994 | Carrier et al. . |
| 5,364,705 | | 11/1994 | Callahan . |
| 5,403,422 | | 4/1995 | Kawai et al. . |
| 5,470,607 | | 11/1995 | Odashima et al. . |
| 5,494,180 | | 2/1996 | Callahan . |
| 5,532,295 | | 7/1996 | Harrison et al. . |
| 5,652,019 | | 7/1997 | Moran . |
| 5,676,785 | | 10/1997 | Samonides . |
| 5,699,733 | | 12/1997 | Chang et al. . |
| 5,890,429 | * | 4/1999 | Alam et al. . |

* cited by examiner

*Primary Examiner*—Merrick Dixon
(74) *Attorney, Agent, or Firm*—Stout, Uxa, Buyan & Mullins, LLP; Donald E. Stout

(57) ABSTRACT

An R-foam having a surface with an electrically resistive ink layer that is continuous and an electrically conductive ink layer that is in a predetermined pattern. The resulting surface is thereby electrically modified to have a predetermined resistive taper across it according to a predetermined resistivity curve. The method of manufacturing the R-foam involves printing the ink layers to the surface in a predetermined pattern that results in the predetermined resistivity curve. The ink layers may be applied using silk screening, stamping, and ink jet printing techniques.

10 Claims, 3 Drawing Sheets

R-FOAM AND METHOD OF MANUFACTURING SAME

BACKGROUND OF THE INVENTION

The present invention relates to a foam structure having a surface with altered electrical attributes and a method of manufacturing same.

In applications where complex electronic circuits are used, the electronic noise generated by such circuits, i.e., the radio frequency/electromagnetic interference, may be of such level as to be hazardous or detrimental to nearby personnel or other electronic circuits. If such electronic noise reaches a high level, a unit may be in violation of federal regulations or the manufacturer's design specifications, requiring the unit to be recalled by the manufacturer. Applications where this is important include low observable or low radar bounce back uses that require radar absorbing materials or structures. Some of these applications include frequency selective services, anechoic chambers, antenna termination, electric and magnetic shielding, and thermal-electric shielding.

One solution to the above problem involves redesigning the circuit components to reduce the radio frequency/electromagnetic interference to acceptable levels. However, this is a costly remedy. It has also been proposed that a foil shield be placed around the electronic circuitry and connected to ground as another viable approach to reducing environmental radiation from electronic circuitry. Toward this end, an aluminum or copper foil has been adhesively coated on both sides of a substrate, and an outer wrapping layer of polyester or plastics material has been applied thereto. However, these metal foil shielding arrangements are relatively costly and are not especially durable.

Electromagnetic interference has been reduced within a microwave module by producing a sheet of absorber material, such as an elastomer material filled with iron powder, cutting out a pattern from the sheet of absorber material to fit around the components within the module (this pattern generally being relatively complex in shape), and then bonding the absorber to the module lid with an adhesive. Foam has been used as the module lid, and for other structures requiring absorber material. However, the precision shaping and positioning required of the sheet of absorber material significantly increases cost.

Another solution involves R-cards (i.e., resistive or conductive ink cards), examples of which are disclosed in U.S. Pat. Nos. 5,494,180 and 5,364,705, both of which are entitled "Hybrid Resistance Cards and Methods of Manufacturing Same," and are incorporated herein in their entireties. R-cards have been fabricated by screen printing an ink having electric altering properties imparted by resistive or conductive ingredients onto a major surface of a carrier. The ink printed carrier is then bonded to a part, such as a foam structure. By using silk screening to apply the inks onto a card, the resolution of the patterns as fine as 1 mil permits the R-card to have an accurate and precise resistivity curve.

However, the R-card carriers have been flat, and may be relatively stiff, cards of various materials. For example, one approach has been to print the ink on a cured epoxy-glass laminate and then subsequently use separate film adhesive material to bond such an R-card to a part. Such an approach increased costs and labor, e.g., due to the adhesive coat operation. Also, R-card rigidness has the drawback of not readily conforming to non-flat surfaces, such as double curved surfaces.

R-film has been developed to overcome some of the difficulties in using R-cards with structures of complex geometries while maintaining the highly accurate and precise resistivity curve. R-film is disclosed in co-pending U.S. Patent Application entitled "Screen Ink Printed Film Carrier and Methods of Making and Using Same from Electrical Field Modulation" filed Dec. 10, 1997, now U.S. Pat. No. 5,890,429 which is incorporated herein in its entirety. R-film is a silk screen printed, electrical altering image on thin adhesive film carrier that is flexible to conform to surfaces that are flat and non-flat. However, the process for using R-film requires multiple steps for printing the film and adhering the film to the structure.

It is known to directly coat surfaces of foam structures using techniques that do not provide high resolution. Some of these techniques are spraying, dipping, and loading the foam with resistive and/or conductive filters. The problem with not having high resolution printing is that the accuracy and precision of predetermined resistivity tapers are compromised.

What is needed, therefore, is a foam structure, and manufacturing method thereof, with a surface having a predetermined resistivity taper of relatively high accuracy and precision that is relatively simple to manufacture.

SUMMARY OF THE INVENTION

Accordingly, it is an object of this invention to provide a foam structure with a surface that has a predetermined resistive taper that is made by a relatively simple process compared to that required by conventional processes.

In order to achieve the above and other objects of the invention, an R-foam is provided with a surface having a combined ink layer printed thereon of an electrically resistive ink layer that is continuous and an electrically conductive ink layer that is in a predetermined pattern. The resulting surface is electrically modified to have predetermined resistive taper from the top portion to the bottom portion according to a predetermined resistivity curve.

In another aspect of the invention, the method of manufacturing the R-foam comprises printing a resistive ink layer and a patterned conductive ink layer to the surface of a piece of foam. The patterned conductive ink layer electrically shorts out portions of the surface in a predictable fashion to achieve a predetermined resistive taper from the top portion of the surface to the bottom portion of the surface according to a predetermined resistivity curve. Other and further objects and advantages will appear hereinafter.

DESCRIPTION OF THE PREFERRED EMBODIMENTS

Figure 1:
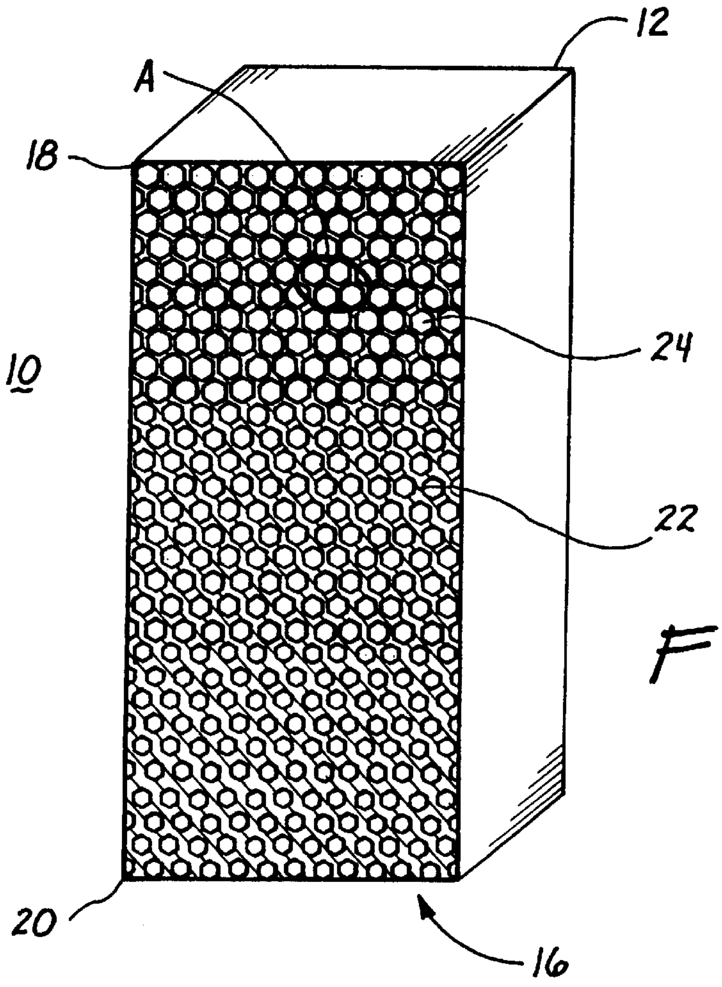
FIG. 1 is a perspective view of an R-foam according to the invention.
Figure 2:
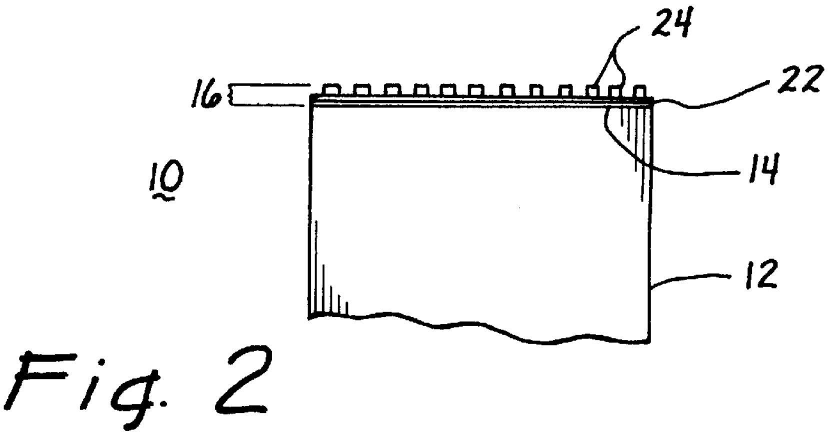
FIG. 2 is a sectional end view of the electrically modified surface of the R-foam according to the invention.

Referring now to the drawings, wherein like reference numerals designate corresponding structures throughout the views, and referring in particular to FIGS. 1 and 2, an R-foam 10 according to an embodiment of the invention is shown. R-foam 10 is a foam structure 12 with a surface 14 on which is printed combined ink layer 16 that electrically modifies the surface 14. The surface 14 has a top portion 18 and a bottom portion 20.

The foam structure 12 is comprised of a syntactic or blown foam with open or closed cell forms and may be thermoplastic or thermosetting. In a preferred embodiment of the invention, the foam is thermoplastic syntactic foam, an example of which is disclosed in U.S. Pat. No. 5,532,295 entitled "Thermoplastic Syntactic Foams and Their Preparation," which is incorporated herein in its entirety. The block shape of the foam structure 12 is only for example and other embodiments of the invention may have foam structures of other shapes.

The R-foam 10 is designed to function in the same manner as a prior art R-foam described in the Background of the Invention, but with greater accuracy and precision over the resistive taper. The accuracy is maintained by using a printing process that applies the two layers of the combined ink layer 16, an electrically resistive ink layer 22 and an electrically conductive ink layer 24, in a controllable fashion. In a preferred embodiment of the invention, the printing process results in a resolution of as fine as 1 millimeter for both pattern and ink layer thickness. Preferred printing processes include silk screening, stamping, and ink jet printing, with the silk screening process being highly preferred.

Figure 3:
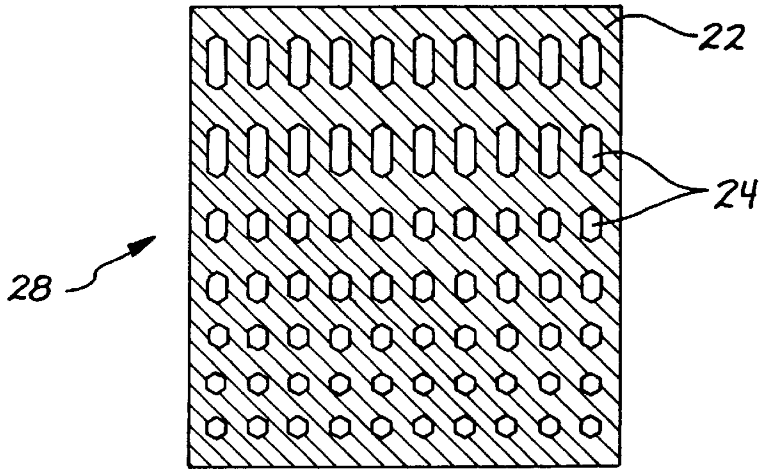
FIG. 3 is an alternative pattern of the electrically modified surface of the R-foam according to the invention.

The resistive taper of the R-foam 10 is a function of the resistive and conductive ink layers 22 and 24. The resistive ink layer 22, shown in black, is applied directly on the surface 14 in a continuous layer, as shown in FIG. 2. In a preferred embodiment, the resistive ink layer 22 has a constant value of N Ohms/Square when the ink layer thickness is kept constant. The thickness of the resistive ink layer 22 may also be tapered to assist in achieving the predetermined resistivity curve. The conductive ink layer 24, shown in white, is used to short out regions on the surface 14. The conductive ink layer 24 is printed on the resistivity ink layer 22 in a plurality of predetermined shapes, such as hexagons as shown. Other embodiments of the invention may have predetermined patterns of other polygons or shapes. FIG. 3 discloses an alternative pattern 28 of the conductive ink layer 24 utilizing progressively elongated hexagons. Other embodiments of the invention may have the discontinuous conductive ink layer 24 printed directly on the surface 14 and the continuous resistive ink layer 22 printed on top of layer 24.

The arrangement of the polygons of the conductive ink layer 24 and spacing between the polygons is also a factor in controlling the resistive taper and the desired ohmic end values of the surface 14. For conceptual clarity, the apparent grid of the resistive ink layer 22 shall be referred to as a grid-like pattern of lines which border and separate the polygons of the conductive ink layer 24. The polygons are laid out in a pattern to control the distance between each one. Where the polygons are larger and the lines between them thinner, the resistivity is lower. Where the polygons are smaller and the lines between them larger, the resistivity is higher. In an embodiment of the invention, the maximum size of any polygon is one-tenth the wavelength of the operating frequency and the minimum size of any polygon is about one-half the size of the largest polygon.

Figure 4:
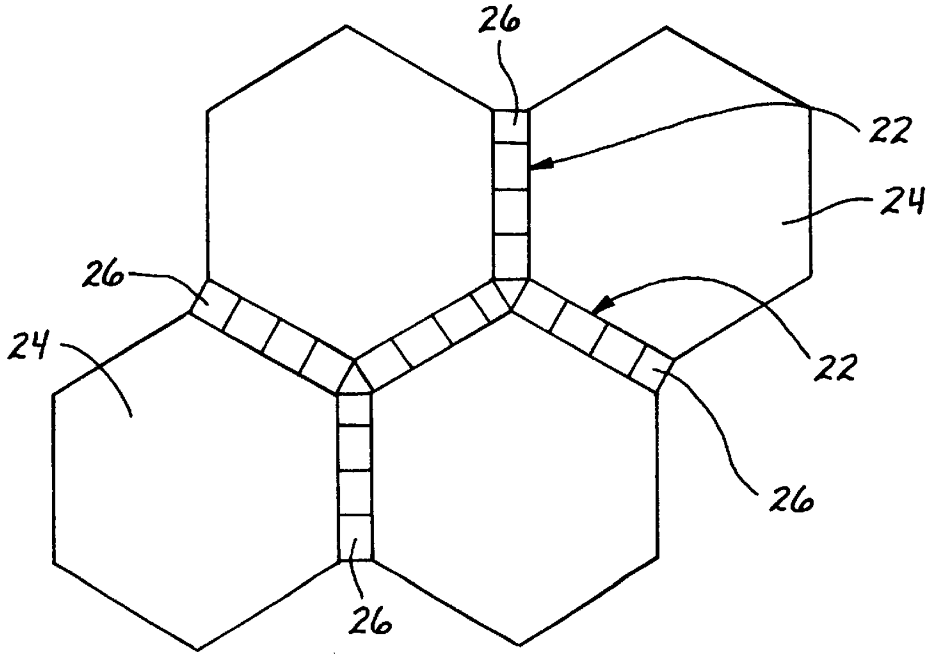
FIG. 4 is the detail A of FIG. 1 of the electrically modified surface of the R-foam according to the invention.

FIG. 4 represents a detailed enlargement of the section of FIG. 1 designated by the reference letter A. The desired resistance of the ink layer at any point of the surface 14 can be determined by knowing the length of the polygon sides and the spacing between each polygon. The resistance can be calculated by knowing the number of squares 26 along each side that are in parallel. FIG. 4 shows how the number of squares 26 is determined. To calculate the resistance, the following equation is employed:

$$R=R_{ink}/N \tag{1}$$

where R is the resistance, $R_{ink}$ is the resistive value of the hybrid ink in Ohms/Square and N is the number of squares between conductive hexagons. For instance, if $R_{ink}$=2000 Ohms/Square and N=4.25 squares, as shown in FIG. 4, R would be calculated as follows:

$$R=2000/4.25=470.588 \text{ Ohms} \tag{2}$$

Figure 5:
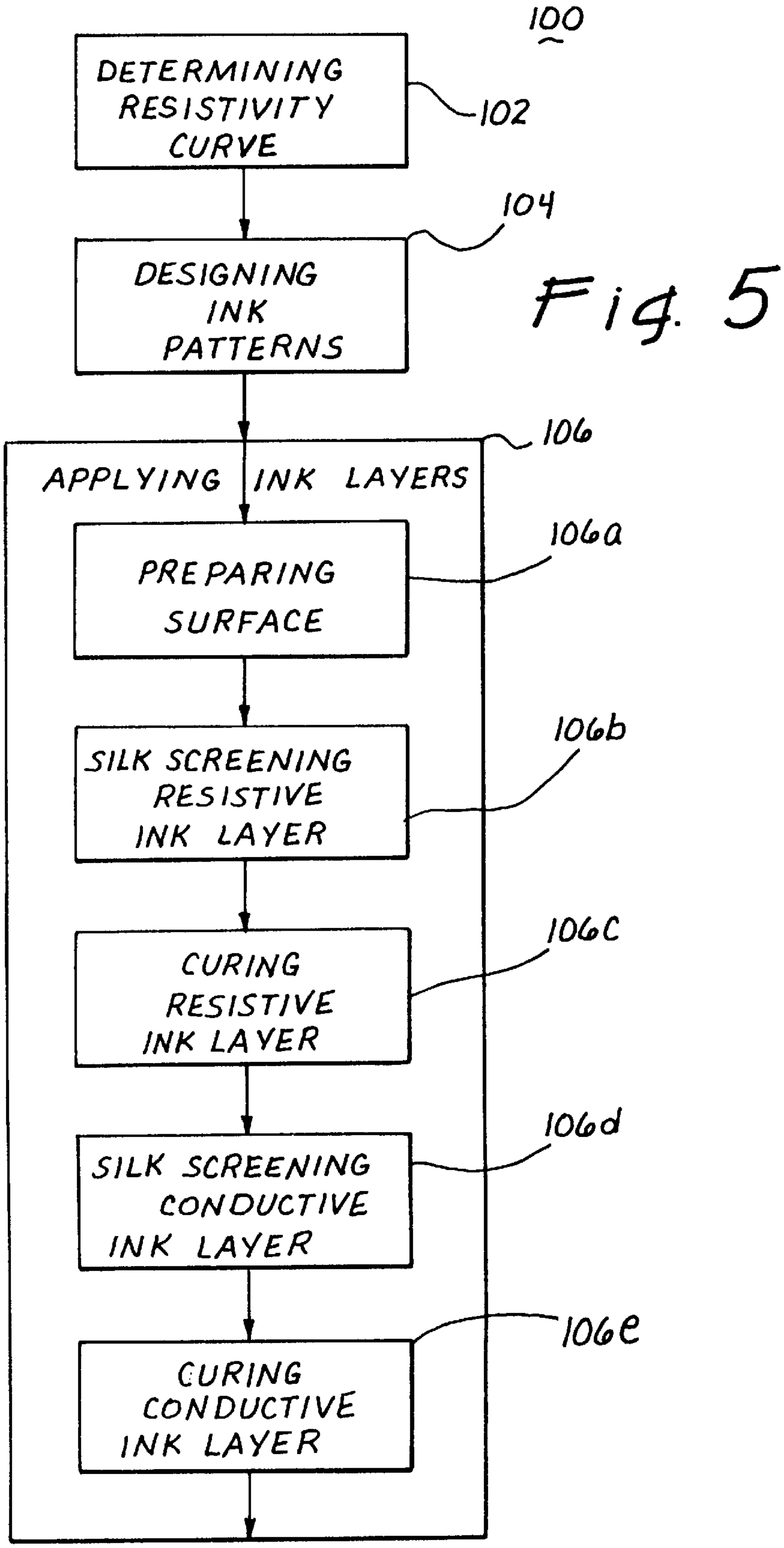
FIG. 5 is a flow chart of the method for manufacturing the R-foam according to the invention.

Referring now to FIG. 5, a preferred method 100 for manufacturing the R-foam 10 starts with a step 102 for predetermining the resistivity curve. This requires determining the ohmic end values of the R-foam surface 14 and the geometry of the surface. The next step 104 involves calculating the lines of the resistivity ink layer 22 and the polygons of the conductivity ink layer 24 needed to achieve the predetermined resistivity curve. The calculating step 104 is disclosed in detail in the previously referenced and incorporated U.S. Pat. Nos. 5,494,180 and 5,364,705 and 5,890,429 using the previously mentioned Equation (1).

In the next step 106 of the method 100, the resistive and conductive ink layers 22 and 24 are applied to the surface 14 of the foam structure 12. As previously stated, the method 100 could use silk screening, stamping, and ink jet printing. The generic techniques of each of these processes is well known. By way of example, the silk screening process will be discussed.

A basic silk screening technique for applying the ink layers 22 and 24 to the surface 14 begins with step 106*a* in which the surface 14 is prepared. The surface 14 needs to be appropriate to accept the ink layers and maintain the required resolution of the patterns. This might require smoothing the surface 14 and/or incorporating a thin film carrier (not shown) into or onto the surface 14. In the next step 106*b*, the resistive ink layer 22 is applied to the surface 14. Following that in step 106*c*, the resistive ink layer 22 is at least partially, if not fully, cured. This is to insure a relatively high resolution of the ink layers. In the next step 106*d*, the conductive ink layer 24 is applied on the resistive ink layer 22. Following that step, in step 106*e*, the conductive ink layer is at least partially cured. It should be mentioned again that the conductive ink layer may be applied before the resistive ink layer in some embodiments of the invention.

The inks used for both the resistive ink layer 22 and the conductive ink layer 24 may be any ink suitable for the chosen printing process, for carrying electrical property additives, and is compatible with the foam structure 12. An embodiment of the invention uses a resistive ink that is carbon-loaded while the conductive ink may have silver dispersed therein. Other electrically altering additives include powdered iron and ferrites. Some possible inks used in practicing the invention include thermosetting resins such as phenolic, epoxy, or polyamide, or any combination thereof. The preferred phenolic resin is a novolac-type phenolic resin including acid-catalyzed condensation products of formaldehyde or para-formaldehyde with a phenolic compound such as phenol, cresol, xylenol and the like. Suitable modified novolac resins include phenol novolac resin, cresol novolac resin, and tert-butyl phenol novolac resin, a nonylphenol novolac resin, and butylated novolac-type phenolic.

The above-mentioned phenolic compounds and the like may be used alone or as a combination of two or more kinds according to need. The carbon black may be added to adjust the flow and viscosity characteristics of the resistive ink to inhibit undue flowing or sagging while still being spreadable.

The overall thickness of the screen printed pattern 11, as dried but not yet cured, generally can be about 0.25 to 1.5 mil, more preferably about 0.5 mil.

The screen printing can be practiced, for example, by using screen-mesh, e.g., about 190–420 mesh, filled with emulsion coating. Sharp pattern edges definition is provided when one or more layers of commercially available direct film photo emulsion are used to fill the screen, the emulsion is image-wise exposed and the desired pattern remains in the screen when the exposed emulsion areas are washed out of the screen with water. Each print with about 190–420 mesh deposits about 0.0003 to 0.001 inches of ink coating material.

The flow characteristics of the thermosetting resins used in any of the screen. prints can be further customized by addition of conventional inorganic fillers and/or thixotropic agents, such as fumed silica (e.g., Cabot Cab-O-Sil products). The shelf life of the inks is about one year from the ink production date at normal room temperature (i.e., about 25° C.).

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A foam structure having a surface with altered electrical attributes, comprising:

at least one foam surface having a top portion and a bottom portion; and a combined ink layer printed directly on said foam surface, said combined ink layer comprising an electrically resistive ink layer that is continuous and an electrically conductive ink layer that is in a predetermined pattern, such that said foam surface has a predetermined resistive taper from said top portion to said bottom portion according to a predetermined resistivity curve.

2. The foam structure as recited in claim 1, wherein:

said resistive ink layer is directly on said foam surface; and said conductive ink layer comprises a plurality of shapes disposed on said resistive ink layer, such that said resistive ink layer appears as a grid-like pattern of lines bordering and separating said shapes.

3. The foam structure as recited in claim 2, wherein said shapes comprise polygons.

4. The foam structure as recited in claim 3, wherein said shapes comprise hexagons.

5. The foam structure as recited in claim 3, wherein the maximum size of said polygons is no larger than one-tenth of the wavelength of the highest frequency for which the foam structure is employed, and the minimum size of said polygons is about one-half of the maximum size of the polygons.

6. The foam structure as recited in claim 3, wherein the width of said lines determines the resistivity of said surface, such that said lines are thinner in areas of said surface having lower resistivity and are wider in areas of said surface having higher resistivity.

7. The foam structure as recited in claim 1, wherein said foam structure comprises a thermoplastic syntactic foam.

8. The foam structure as recited in claim 1, wherein said conductive ink layer comprises a plurality of shapes on said foam surface and said resistive ink layer extends continuously over said foam surface and said conductive ink layer.

9. The foam structure as recited in claim 1, wherein the thickness of said resistive ink layer varies in thickness across the surface of said foam structure in a predetermined manner in order to assist in achieving said predetermined resistivity curve.

10. The foam structure as recited in claim 1, wherein said foam surface comprises a carrier film.

* * * * *